US008990212B1

(12) United States Patent
Zenger

(10) Patent No.: US 8,990,212 B1
(45) Date of Patent: Mar. 24, 2015

(54) SYSTEMS AND METHODS OF MAPPING MULTIDIMENSIONAL DATA AND EXECUTING QUERIES

(71) Applicant: Visier Solutions, Inc., Vancouver (CA)

(72) Inventor: Geoffrey Benjamin Zenger, New Westminster (CA)

(73) Assignee: Visier Solutions, Inc., Vancouver (CA)

( * ) Notice: Subject to any disclaimer, the term of this patent is extended or adjusted under 35 U.S.C. 154(b) by 0 days.

(21) Appl. No.: 14/227,658

(22) Filed: Mar. 27, 2014

(51) Int. Cl.
  G06F 17/30     (2006.01)
(52) U.S. Cl.
  CPC .... *G06F 17/30424* (2013.01); *G06F 17/30339* (2013.01); *G06F 17/30598* (2013.01)
  USPC .......................................................... 707/737
(58) Field of Classification Search
  CPC ................... G06F 17/30298; G06F 17/30598; G06F 17/30584; G06F 17/30592
  USPC .......................................................... 707/737
  See application file for complete search history.

(56) References Cited

U.S. PATENT DOCUMENTS

| | | | |
|---|---|---|---|
| 6,418,427 B1 | 7/2002 | Egilsson et al. | |
| 6,768,986 B2 * | 7/2004 | Cras et al. ............................. | 1/1 |
| 6,829,621 B2 | 12/2004 | Keller | |
| 7,562,086 B2 | 7/2009 | Mirchandani et al. | |
| 7,664,777 B2 * | 2/2010 | Cras et al. ..................... | 707/600 |
| 8,468,125 B2 | 6/2013 | Tarnoff et al. | |
| 8,600,709 B2 | 12/2013 | Guild et al. | |
| 8,612,421 B2 | 12/2013 | Dombroski et al. | |
| 2007/0027904 A1 | 2/2007 | Chow et al. | |
| 2011/0246415 A1 * | 10/2011 | Li et al. ......................... | 707/602 |
| 2012/0221510 A1 * | 8/2012 | Li et al. ......................... | 707/602 |
| 2013/0238549 A1 | 9/2013 | Aski et al. | |
| 2014/0095502 A1 * | 4/2014 | Ziauddin et al. .............. | 707/737 |

OTHER PUBLICATIONS

"Defining a Many-to-Many Relationship", Version dated Jan. 18, 2013, Retrieved from <<https://web.archive.org/web/20130118024507/http://technet.microsoft.com/en-us/library/ms170463.aspx>>, 2013, Microsoft, 5 pages.
Russo et al., "The Many-to-Many Revolution; Advanced Dimensional Modeling with Microsoft SQL Server Analysis Services"; Version 2.0 Revision 1, Oct. 10, 2011, Downloaded from <<http://www.sqlbi.com/wp-content/uploads/The_Many-to-Many_Revolution_2.0.pdf>>, pp. 1-147.

* cited by examiner

*Primary Examiner* — Jean M Corrielus
(74) *Attorney, Agent, or Firm* — Toler Law Group, PC

(57) ABSTRACT

A method includes identifying a source fact table, where the source fact table includes a first set of dimensions and corresponds to a source multidimensional cube that is associated with a first set of measures. The method also includes identifying a mapped multidimensional cube, where the mapped multidimensional cube is associated with a second set of dimensions and a second set of measures. The method further includes adding, to the source fact table, a one or more mapped dimensions corresponding to the second set of dimensions. The method includes associating, with the source multidimensional cube, one or more mapped measures corresponding to the second set of measures.

13 Claims, 11 Drawing Sheets

*FIG. 6*

Query A: What is the total leave liability of male employees? - *Drillthrough*

Topic Guide | Metric Explorer | Dashboards | Snapshots

BlueCircle ▼ in (All Loc.▼) during (2014▼) with characteristics (Gender: Male ▼) (+) = 4,978

Liability amount ▼ 945.3 days (?)

*BlueCircle Enterprises*

John Smith ▼

904 days 1000 days

Cole Abbott
Daryl Abbott
Chet Abbott
Brendon Abbott
Isidore Abbott
Laird Abbott
Placido Acevedo
Joe Acevedo
Bradley Acevedo
Donnie Acevedo
Peter Acosta
Freddie Acosta

Brendon Abbott
Engineering

Employee ID                 1009101
Top-Level Manager Org.      Sales & Mkt
Top-Level Manager           Quiana Miller
Manager                     Athena Morales
Country                     US
City                        Houston
Hire Date                   Apr. 1, 2013
Pay Level                   5
Salary                      $141.25k
Direct Compensation         $166.56k
Vacation                    4 day(s)
Banked Overtime             1 day(s)
...

Download 1  (2)(3)(4)(5)(6)(7)(8)(9)(10) ▲ ... 332

Okay

SYSTEMS AND METHODS OF MAPPING MULTIDIMENSIONAL DATA AND EXECUTING QUERIES

BACKGROUND

Business enterprises often use computer systems to store and analyze large amounts of data. For example, an enterprise may maintain large databases to store data related to sales, inventory, accounting, human resources, etc. To analyze such large amounts of data, an information technology (IT) department at the enterprise may hire business integrators and consultants to generate enterprise-specific business reports (such as by developing custom reporting software applications). As additional data becomes available, the business integrators and consultants may define additional database tables to store the data and multidimensional data structures (e.g., cubes) to use when analyzing the data. Because the amount of data available in an enterprise can quickly increase, it may be difficult for users to remain up-to-date regarding all of the available tables and structures. Further, due to the large number of disparate tables/structures, it may be difficult for the users to detect and analyze relationships between data in different tables/structures.

SUMMARY

Systems and methods of mapping multidimensional data and executing queries based on the mappings are disclosed. For example, during rollout of an analytics system at an enterprise, data may have been classified into discrete data sets. Each data set (e.g., fact table(s)) may be associated with its own multidimensional cube that is loaded into memory (e.g., random access memory (RAM)) and used to compute execution results of queries. As an illustrative, non-limiting example, in a workforce analytics context, different fact tables and cubes may be used for employee data, leave liability data, and sales opportunity data. Each fact table may have different dimensions (which group facts into sets and may be considered analogous to columns) and each cube may support calculation of different measures. In this example, a seemingly simple query, such as "What is the average leave liability value of my male employees?" may be difficult to answer because multiple data sets and cubes may be involved and because mapping between employees and leave liabilities may not be available.

In accordance with the described techniques, mappings between data in different cubes may be automatically created and made available for use to compute query execution results. One of the fact tables/cubes (e.g., employees) may be designated a "base" or "source" fact table/cube, and one or more other cubes (e.g., leave liabilities, sales opportunities, etc.) may be designated as "mapped" cubes. For each dimension of a mapped cube, a "mapped dimension" may be added to the source fact table. Thus, mapped dimensions may be considered as additional columns in the source fact table. In addition, for each measure supported by a mapped cube, a "mapped value" and a "mapped measure" may be defined for the source cube. The described techniques may thus be used to define one-to-many relationships by relating facts in the source table/cube to sets in the mapped cubes. For example, a particular employee in the employees cube may have multiple leave liabilities (e.g., X days of vacation leave, Y days of sick leave, Z days of banked overtime, etc.). Thus, for that employee, a one-to-many relationship may exist between the employee cube and the leave liabilities cube.

Mapped dimensions and mapped measures may be used during query execution. To illustrate, for the above query regarding the average leave liability of male employees, values corresponding to a mapped "leave liability value" dimension in the employees fact table may be averaged and a filter "Gender=Male" may be used. Advantageously, because mapped dimensions and mapped measures are added to the source fact table/cube, a user may continue to assume that he or she is working with "employee" data, even when executing queries corresponding to a different data source (e.g., a leave liability data source). Thus, the described mapping techniques may be applied in a manner that is transparent to consumers of the data being mapped.

BRIEF DESCRIPTION OF THE DRAWINGS

FIG. 6 illustrates a second particular embodiment of a GUI that is generated by the system of FIG. 1;

DETAILED DESCRIPTION

Figure 1:
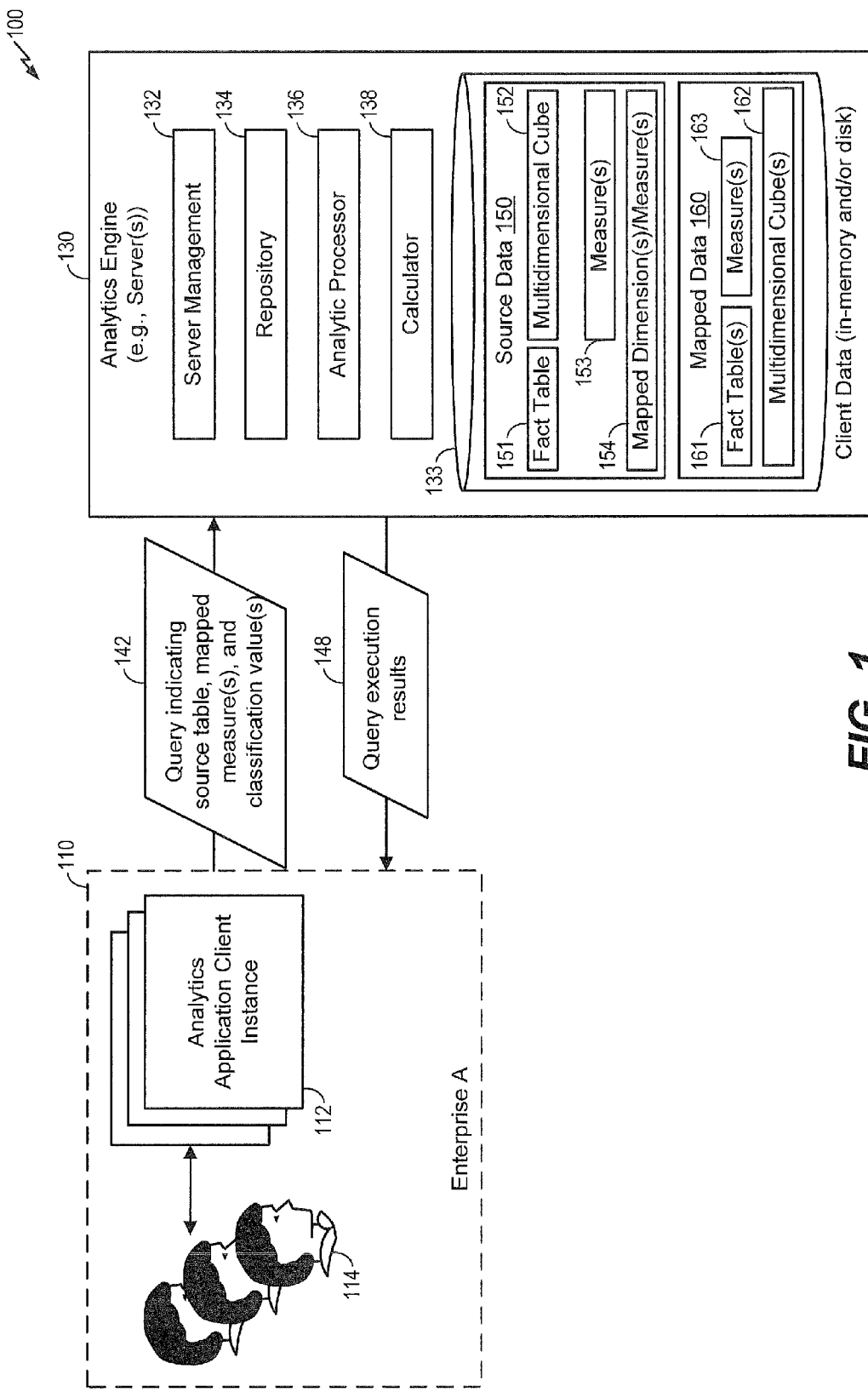
FIG. 1 is a diagram that illustrates a particular embodiment of a system that is operable to map multidimensional data and perform query execution.

Referring to FIG. 1, a particular embodiment of a system 100 that is operable to map multidimensional data and perform query execution is shown. The system 100 includes a client-server analytics platform. The client portion of the platform is illustrated in FIG. 1 by client instances 112. The server portion of the platform is illustrated in FIG. 1 by an analytics engine 130.

In a particular embodiment, each of the client instances 112 may be a "thin" client application, such as an Internet-accessible web application, that presents graphical user interfaces (GUIs) based on communication with the analytics engine 130. In FIG. 1, the analytics platform is available to an enterprise 110 (e.g., a company, a corporation, a government department, an education institution, or other entity). The enterprise 110 is associated with one or more users 114 (e.g., employees) that have the ability to execute the one or more client instances 112. Each of the users 114 may log in to a website or web application corresponding to a client instance 112 using a browser of a computing device, such as a desktop computer, a laptop computer, a mobile phone, a tablet computer, etc. The process of logging in identifies the user and the rights he/she may have with respect to the data that is being accessed. The enterprise 110 may acquire access to the analytics platform (e.g., via a purchase, a license, a subscription, or by another method).

It should be noted that although a single enterprise 110 is shown in FIG. 1, in alternate embodiments, any number of enterprises and client instances may be present in the system 100. Each enterprise 110 may provide the analytics platform (e.g., the client instances 112 and/or the analytics engine 130) access to their respective client data 133. For example, the enterprise 110 may upload the client data 133 to the analytics engine 130. The uploaded data may be "cleaned" (e.g., via data integrity checks and error-correction operations), transformed, and loaded into an in-memory database at the analytics engine 130. The client data 133 may represent internal enterprise data that is analyzed by the analytics platform. For example, when the analytics platform is a workforce analytics platform, the client data 133 may represent internal databases that store data regarding employee compensation, diversity, organizational structure, employee performance, recruiting, employee retention, retirement date, etc.

The analytics engine 130 may be configured to receive queries (e.g., an illustrative query 142) from the client instances 112, execute the queries, and provide results of executing the queries (e.g., illustrative query execution results 148) to the client instances 112. In a particular embodiment, the analytics engine 130 includes a server management module 132 that is configured to manage a server environment and provide interfaces to handle requests. For example, the server management module 132 may communicate with the client instances 112. In a particular embodiment, the communication is performed via scripts, servlets, application programming interfaces (APIs) (e.g., a representational state transfer (REST) API), etc. The server management module 132 may also expose services and/or data to the client instances 112. For example, exposed services and data may include query output, session and user account management services, server administration services, etc. The server management module 132 is further described with reference to FIG. 2.

The analytics engine 130 may also include a repository 134. In a particular embodiment, the repository 134 stores models, such as data models and processing models. The models may include query declarations and metric definitions, as further described with reference to FIG. 2. The models may also include analysis and prediction models. The analytics engine 130 may further include an analytics processor 136 and a calculator 138. The analytics processor 136 may be configured to coordinate lookup and function call operations during query execution, as further described with reference to FIG. 2. The calculator 138 is configured to access data (e.g., in-memory data cubes) to calculate the value of functions and metrics, as further described with reference to FIG. 2.

In a particular embodiment, the analytics engine 130 stores client data 133. The client data 133 may include multiple fact tables, which may correspond to multiple data sources. For example, in the context of a workforce analytics application, the client data 133 may include an employees fact table, a leave liabilities fact table, and a sales opportunities fact table. Each fact table may have different dimensions. For example, the employees fact table may include dimensions for location, gender, role, top talent (e.g., whether a particular employee is considered a top talent employee), and employee ID. As another example, the leave liability fact table may include dimensions for liability type and owner ID. As yet another example, the sales opportunity fact table may include dimensions for location, opportunity type, opportunity status, and owner ID. In some examples, a dimension may be considered analogous to a column of a table. Alternately, a dimension (e.g., location) may be used to group facts into "members" or "sets" (e.g. "US," "Canada," "Washington," "Oregon," "Vancouver," etc.).

Certain fact tables in the client data 133 may be associated with a corresponding multidimensional data cube that is loaded into memory to perform computations. A cube may be a logical construct that has a one-to-one correspondence with a business concept (e.g., entity) and that is used to pose structured analytic questions about the entity. Cubes may typically be "backed" by a fact table, but cubes may also be constructed on pre-aggregated data from an external data source, such as in the case of benchmark of planning data. For example, although a planner may plan on selling a particular amount (e.g., $50,000) of product, the planner may not generate predicted fact records for each individual sale contributing to the total quantity of $50,000.

Each multidimensional data cube may be associated with (e.g., support computations of) different measures. For example, the employee cube may support a "salary" measure that, when executed for an employee ID, returns a value corresponding to a salary of the employee having the employee ID. The employee cube may also support a "count" measure that returns a headcount of the number of employees in a selected group of employee IDs (e.g., corresponding to a particular location, departmental organization, etc.). As another example, the leave liability cube may support a "liability value" measure that returns a monetary value of a leave liabilities for a set of selected owner IDs and a "liability days" measure that returns a number of days of leave liability that have been accrued by a set of selected owner IDs. As another example, the sales opportunity cube may support an "expected value" measure that returns an expected monetary value of sales opportunities belonging to selected owner ID(s). Examples of the employees table/cube, leave liabilities table/cube, and sales opportunity table/cube are designated 310, 320, and 330, respectively, in FIG. 3. Although singular elements are designated in FIG. 3 as being both fact tables and multidimensional cubes, this is for ease of illustration only and not to be considered limiting. In some examples, if a multidimensional cube has an underlying fact table, the fact table and the multidimensional cube may be considered as interchangeable and may include the same data. Thus, in some examples, during operation at the analytics engine 130, an N-dimensional cube (where N is an integer greater than zero) may be constructed in-memory by loading the columns of an N-column fact table.

During operation, a user (e.g., one of the users 114) may formulate many different types of queries. Certain queries may be "simple" queries that involve data from a single fact table, and may therefore be executed using a single multidimensional cube. For example, the query "How many female employees do I have?" may be executed on the basis of the employees fact table/cube. However, other queries may be "complex" queries that involve data from multiple fact tables/cubes. Four examples of such "complex" queries, designated Query A-D, are given in Table 1 below. Table 1 also indicates the cubes that may be involved in executing such complex queries.

TABLE 1

Query A: What is the total leave liability of male employees?
Cubes Involved: Employees, Leave Liabilities
Query B: What is the total leave liability of male employees, broken down by liability type and location?

TABLE 1-continued

Cubes Involved: Employees, Leave Liabilities
Query C: What is the breakdown of sales opportunities for top talent employees by employee location and sales opportunity location?
Cubes Involved: Employees, Sales Opportunities
Query D: Do employees with a large expected value of sales opportunities have a large number of leave liability days?
Cubes Involved: Employees, Sales Opportunities, Leave Liabilities To execute complex queries like the queries indicated in Table 1, some systems may define relational joins between underlying fact tables to create a new fact table, and then define a new cube on the resulting view. However, this approach requires an explicit view, new fact table, and new cube for each combination of relationships. For example, under such an approach, a first new cube (e.g., a new Employees-Leave Liabilities cube) would be defined for Queries A and B, a second new cube (e.g., an Employees-Sales Opportunities cube) would be defined for Query C, and a third new cube (e.g., an Employees-Leave Liabilities-Sales Opportunities cube) would be defined for Query D. Further, the combined objects (business concepts) represented by the newly defined cubes may be undefined or may be difficult to interpret for the user. For example, it may be unclear what the sum of a "salary" column represents in the new employee-leave liability cube. It may also be difficult to interpret "drillthrough" queries on the new cubes to view individual employees, leave liabilities, and sales opportunities. For example, one record would be returned for each combined object (e.g. each Employee-Leave Liability pair) instead of one per "standard" object (e.g. employee). Drillthrough queries are further described with reference to FIG. 6.

The data mapping techniques of the present disclosure enable executing complex queries, such as Queries A-D in Table 1 above, without defining new joins and without creating new multidimensional data cubes. Moreover, the described mappings may operate without increasing user-perceived complexity. For example, even when using the mappings to execute complex (e.g., multi-cube) queries, a user may continue to assume that he or she is working with "employee" data, instead of having to think about more complicated "leave liability employee items." In accordance with the described techniques, a first subset of the client data 133 is designated as "source" data 150. Another (e.g., remaining) subset of the client data 133 is designated as "mapped" data 160, and mappings are defined between a "source" data table and each "mapped" data table. In a particular embodiment, the source cube (e.g., the employees cube) has an underlying fact table but all mapped cubes need not have an underlying fact table (e.g., one or more mapped cubes may correspond to aggregate data from an external data source). In the workforce analytics example described above and illustrated in FIG. 3, the employees fact table may be a source fact table 151, the employees cube may be a source multidimensional cube 152, and measures 153 associated with the source multidimensional cube 152 may include the salary measure and the count measure. The leave liabilities fact table and the sales opportunities fact table may be mapped fact table(s) 161, and the leave liabilities cube and the sales opportunities cube may be mapped multidimensional cube(s) 162. Measure(s) 163 associated with the mapped multidimensional cube(s) 162 may include the liability value measure, the liability days measure, and the expected value measure.

Upon startup at the analytics engine 130, or in response to an event (e.g., user input, expiration of a timer, etc.), the analytics engine 130 may automatically generate mappings between the source data 150 and the mapped data 160. For example, the analytics engine 130 may determine that a particular dimension (e.g., column) in the source fact table 151 corresponds to a dimension in each of the mapped fact tables 161.

To illustrate, the employee ID dimension in the employees fact table may correspond to the owner ID dimension in the leave liabilities table and the owner ID dimension in the sales opportunity table. Further, the employee ID dimension may uniquely identify each employee in the employee fact table. In response to the determination, the analytics engine 130 may designate the employee ID dimension in the employees fact table as a "mapping key" dimension that will be used to determine one-to-many mappings from employees to leave liabilities and from employees to sales opportunities. For example, a particular employee "John Smith" may have employee ID=12345. The leave liabilities fact table may include two facts (e.g., rows) having owner ID=12345—a first row having liability type=vacation and indicating John Smith's accrued vacation leave, and a second row having liability type=banked overtime and indicating John Smith's banked overtime leave.

Figure 4:
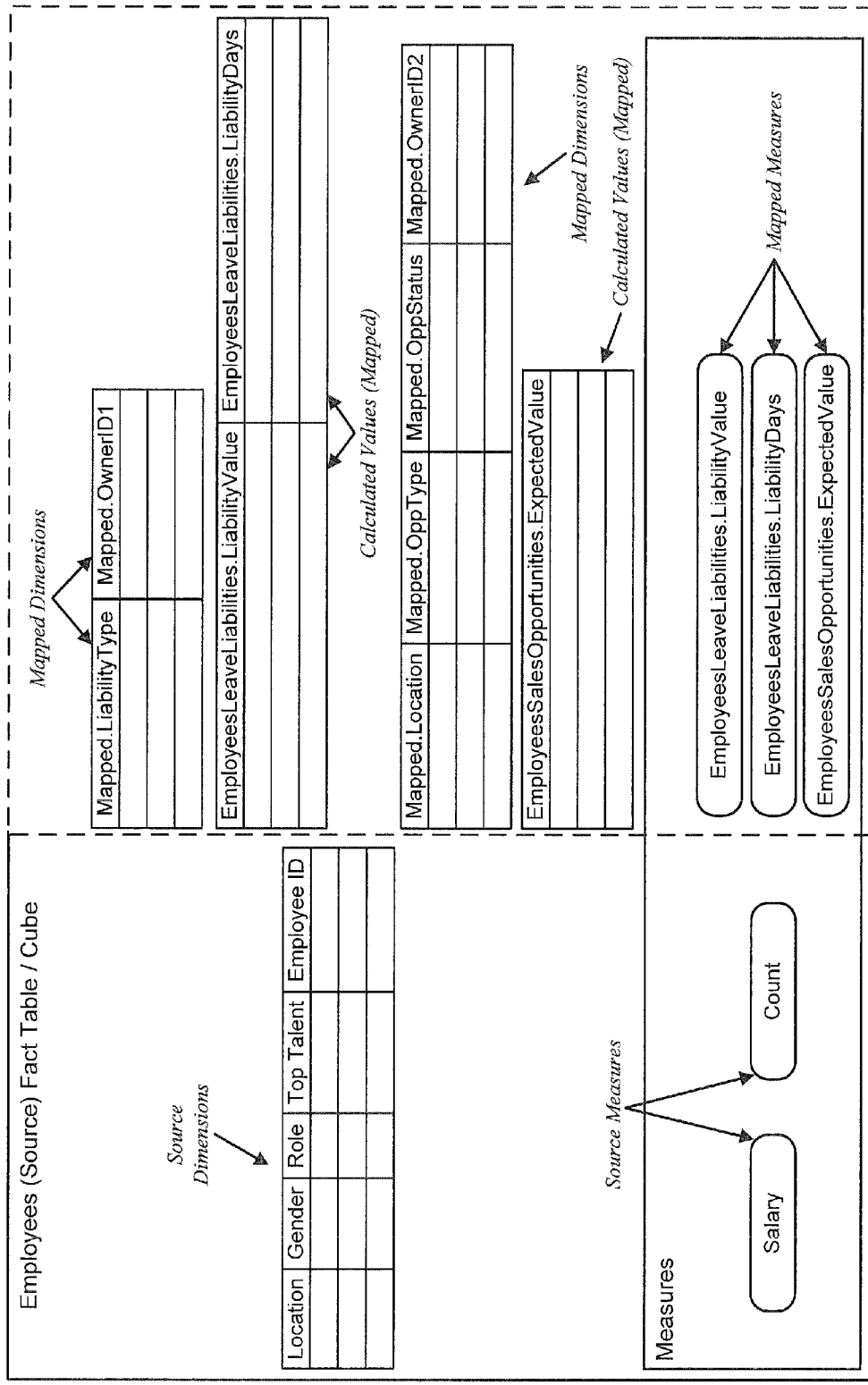
FIG. 4 illustrates adding mapped dimensions and mapped measures to the source fact table of FIG. 3.

Generating mappings from the employees fact table to the leave liabilities fact table and the sales opportunities fact tables is shown in FIG. 4. As shown in FIG. 4, a mapped dimension for each dimension in the leave liabilities table and the sales opportunities table may be added to the employees fact table. For ease of illustration, the name of each mapped dimension begins with the term "Mapped." In the example of FIG. 4, a number is appended to mapped dimensions with the same name for disambiguation (e.g., Mapped.OwnerID1, Mapped.OwnerID2). In an alternate embodiment, if multiple mapped tables have the same dimension, then a corresponding mapped dimension may only be added to the source table once. Further, in some embodiments, if the source table includes the same dimension as a mapped table, and the dimension in the two tables has the same meaning, a corresponding mapped dimension may not be added to the source table. For example, although the Employees table has a "Location" dimension, a "Mapped.Location" dimension is nonetheless added to the Employees table in FIG. 4. The "Mapped.Location" dimension corresponds to the Sales Opportunities table and is added because "Location" in the Employees table has a different meaning (e.g., a location that an employee works) than "Location" in the Sales Opportunities table (e.g., a location of a sales opportunity). In contrast, if the Sales Opportunities table included an "Employee ID" dimension, then in some embodiments a "Mapped.EmployeeID" dimension may not be added to the Employees table because "Employee ID" has the same meaning in both tables (e.g., a unique identifier of an employee).

Thus, as shown in FIG. 4, adding mapped dimensions may be considered analogous to adding columns to a table. Whereas each row of the source columns (e.g., Gender, EmployeeID, etc.) has static values, each row of a mapped dimension column may contain a formula that can be dynamically evaluated at runtime (e.g., query execution time). For example, the value in the "Mapped.LiabilityType" for a particular employee can be dynamically evaluated at runtime (e.g., query execution time) based on the EmployeeID of the particular employee and a matching OwnerID in the mapped Leave Liabilities cube.

Further, as shown in FIG. 4, a mapped measure is added to the employees cube for each measure of the leave liabilities cube and the sales opportunities cube. For ease of illustration, the name of each mapped measure begins with a concatenation of the source cube name and the mapped cube name (e.g., EmployeesLeaveLiabilities or EmployeesSalesOpportunities). The mapped dimension(s) and mapped measure(s) are collectively designated 154 in FIG. 1.

In a particular embodiment, the analytics engine 130 may add "calculated values" to the source cube, where each calculated value is a formula that can be used to dynamically compute a value of a corresponding mapped measure. Thus, as shown in FIG. 4, calculated values called "EmployeesLeaveLiabilities.LiabilityValue," "EmployeesLeaveLiabilities.LiabilityDays," and "EmployeesSalesOpportunities.ExpectedValue" are added to the employees cube. Use of the calculated values is further described herein.

It will be appreciated that by adding mapped dimensions to the source cube, the analytics engine 130 may enable filtering operations on source data (e.g., employees) based on mapped dimensions. The mapped dimensions may be used for filtering when computing mapped measures or mapped calculated values, but may be ignored otherwise when computing source measures. To illustrate, a filtering criterion "Mapped.LiabilityType=Sick" may be applied when computing the EmployeesLeaveLiabilities.LiabilityValue measure, but may be ignored when computing the Count (i.e., headcount) measure.

As described above, mappings between the source data 150 and the mapped data 160 may be automatically generated and/or updated at startup of the analytics engine 130 or in response to an event. In a particular embodiment, mapping information regarding the source fact table 151, the mapped fact table(s) 161, and the mapped dimension(s)/measure(s) 154 may be stored at the analytics engine (e.g., in one or more files). As an illustrative, non-limiting example, the mapping information may include, but is not limited to:
<factTableMapping name="EmployeesLeaveLiabilities"
sourceFactTable="Employees"
sourceKeyDimension="Employee ID"
mappedFactTable="LeaveLiabilities"
mappedDimension="Owner ID"/>
<factTableMapping name="EmployeesSalesOpportunities"
sourceFactTable="Employees"
sourceKeyDimension="Employee ID"
mappedFactTable="SalesOpportunities"
mappedDimension="Owner ID"/>

The analytics platform shown in FIG. 1 may support analysis regarding a set of semantic items. A "semantic item" may be a high-level concept that is associated with one or more terms (or lingo), questions, models, and/or metrics. For example, in the context of workforce analytics, semantic items may be associated with terms such as "employee," "organization," "turnover," etc. The semantic items may also be associated with business questions such as "What is the 'Cost' of 'Employee' in the 'Sales' organization in 'North America' in 'First Quarter, 2012'?", "How is my 'Cost' 'now' compared to 'the same period last year'?", the Queries A-D in Table 1 above, etc. The semantic items may further be associated with business models, such as models for cost of turnover, indirect sales channel revenue, etc. Semantic items may include metrics or key performance indicators (KPIs), such as revenue per employee, cost per employee, etc.

When a particular user 114 logs in to a particular client instance 112, the client instance 112 may display a graphical user interface (GUI) that is operable to generate various data analysis queries to be executed by the analytics engine 130. For example, the particular client instance 112 may send (e.g., via a network, such as a local area network (LAN), a wide area network (WAN), the Internet, etc.) a query 142 to the analytics engine 130. In a particular embodiment, the query 142 may involve performing data processing operations with respect to data corresponding to multiple fact tables/cubes. To illustrate, the query 142 may correspond to one of the Queries A-D from Table 1, above.

The query 142 may indicate a source fact table, a mapped measure, filtering value(s), and/or grouping value(s). Illustrative examples of such information for Queries A-D are provided in Table 2 below. Each query indicates the employees fact table 310 of FIG. 3 as the source fact table (as opposed to indicating multiple fact tables or cubes). Certain queries also indicate "slices" and/or "axes." As further described herein, "slices" correspond to filtering values that are used during execution of a query and "axes" correspond to grouping values that are used to generate axes of a chart displayed by the client instance 112 as part of a GUI, such as one or more of the GUIs described with reference to FIGS. 5-9. Filtering values and grouping values are collectively referred to herein as "classification values."

TABLE 2

Query A: What is the total leave liability of male employees?
Source Table: Employees
Measure: Sum of EmployeesLeaveLiabilities.LiabilityValue
Slices: Gender = Male
Query B: What is the total leave liability of male employees, broken down by liability type and location?
Source Table: Employees
Measure: Sum of EmployeesLeaveLiabilities.LiabilityValue
Slices: Gender = Male
Axes: All Locations, All Mapped.LiabilityTypes
Query C: What is the breakdown of sales opportunities for top talent employees by employee location and sales opportunity location?
Source Table: Employees
Measure: Sum of EmployeesSalesOpportunities.ExpectedValue
Slices: Top Talent = Y
Axes: All Locations, All Mapped.Locations
Query D: Do employees with a large expected value of sales opportunities have a large number of leave liability days?
Source Table: Employees
Measure: Sum of EmployeesSalesOpportunities.ExpectedValue
Axes: Ranges of EmployeesLeaveLiabilities.LiabilityDays In response to receiving the query 142, the analytic processor 136 may initiate one or more computations. For example, the query 142 may correspond to "What is the sum of salaries for our top non-talent employees by each gender and location?" In this example, the query 142 indicates:
Cube: Employees
Measures: "Sum of Salary"
Slices: Top Talent=N
Axes: All Genders, All Locations.

For purposes of illustration, assume the Employees table is as shown in Table 3:

TABLE 3

| EmployeeID | Location | Gender | Role | Top Talent | Salary |
|---|---|---|---|---|---|
| 1 | Canada | M | Engineer | Y | $10 |
| 2 | US | M | Sales | N | $20 |
| 3 | US | F | Executive | N | $50 |
| 4 | US | M | Sales | N | $80 |

To execute the query 142, the analytics engine 130 may generate a "cell set." The cell set may include one or more cells, where each cell corresponds to a unique combination of the axes. For example, if the query indicates M classification values associated with a first dimension and N classification values associated with a second dimension, the cell set may include M×N cells. Thus, in the instant example, the cell set may include the following cells:

Cell 1: (Female, Canada)
Cell 2: (Female, US)
Cell 3: (Male, Canada)
Cell 4: (Male, US)

Next, the analytics engine 130 may filter facts of the Employees table (Table 3) according to the slice(s) indicated in the query 142 to map facts to cells according to the axes:

Cell 1={ }
Cell 2={Employee 3}
Cell 3={ }
Cell 4={Employee 2, Employee 4}

Notably, Employee 1 is not mapped to cell 3 because Employee 1 does not satisfy the slicing value Top Talent=N. After the facts have been mapped to the cells, the analytics engine 130 evaluates the measure indicated by the query, i.e., "Sum of Salary" on each cell:

Cell 1 Value=$0
Cell 2 Value=$50
Cell 3 Value=$0
Cell 4 Value=$20+$80=$100

The computed values may be provided by the analytics engine 130 to the client instance 112 as the query execution results 148. The client instance 112 may use the query execution results 148 to generate/populate a visualization, such as a graph. Although in the above example the query 142 is a single-cube query, a similar process to the process described below may be used for multi-cube queries. For example, cells of the cell set may be populated with facts from the source table/cube. A mapped measure may then be evaluated on the basis of the mapped cube. To illustrate, a mapped measure from the Leave Liabilities cube may be evaluated using a correspondence between EmployeeID and OwnerID. Examples of executing such multi-cube queries are further described with reference to FIGS. 5-9.

The system 100 of FIG. 1 thus illustrates automatically mapping multidimensional data from a source fact table/cube to a mapped fact table/cube without performing a join operation and without defining a new cube based on a result of the join operation. In particular, the columns added to the source fact table include formulae instead of static values. Thus, the mappings may be defined without duplicating the underlying "raw" data in the mapped table/cube, and the formulae can be dynamically evaluated at run-time based on the mapped fact table/cube.

Figure 2:
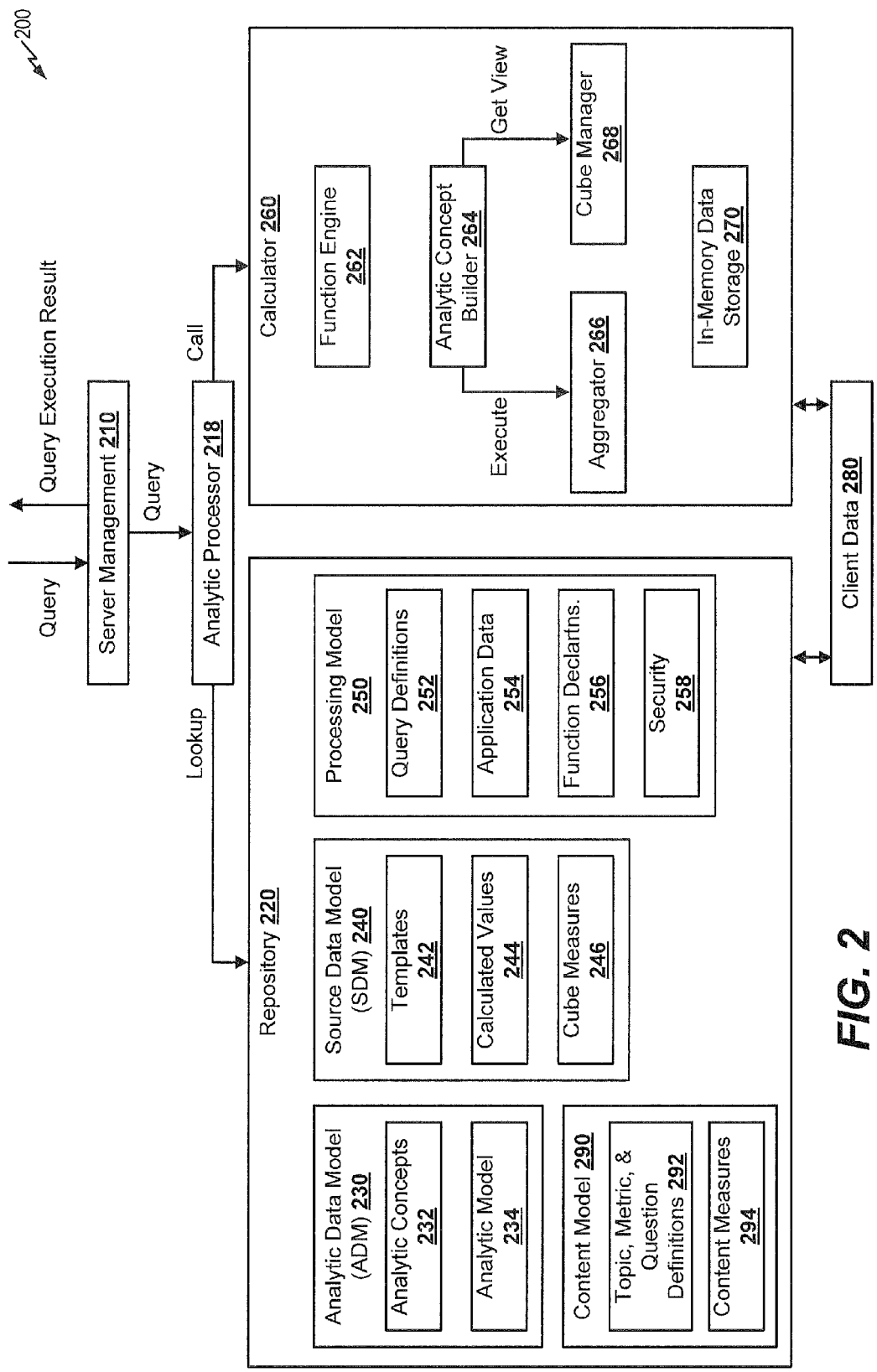
FIG. 2 is a diagram that illustrates a particular embodiment of an analytics engine of the system of FIG. 1.

FIG. 2 is a diagram to illustrate a particular embodiment of an analytics engine 200. In an illustrative embodiment, the analytics engine 200 corresponds to the analytics engine 130 of FIG. 1. The analytics engine 200 may include a server management module 210 (e.g., corresponding to the server management module 132 of FIG. 1), an analytic processor (e.g., corresponding to the analytic processor 136 of FIG. 1), a repository 220 (e.g., corresponding to the repository 134 of FIG. 1), and a calculator 260 (e.g., corresponding to the calculator 138 of FIG. 1). In a particular embodiment, each component of the analytics engine 200 corresponds to hardware and/or software (e.g., processor executable instructions) configured to perform particular functions described herein. In one example, the analytics engine 200 corresponds to a server-side architecture of an analytics platform and is implemented by one or more servers, such as web servers and/or data servers.

The server management module 210 may be configured to manage a server environment and entry points that are exposed to clients, such as the client instances 112 of FIG. 1. For example, client requests may be in the form of queries, such as the query 142 of FIG. 1. The results of executing a specified query, such as the query execution results 148, may be used by the client instances 112 to generate particular business analysis interfaces, reports, etc.

The analytic processor 218 may be configured to manage various operations involved in query execution. For example, the analytic processor 218 may perform lookup operations with respect to the repository 220 and call (e.g., a function call) operations with respect to the calculator 260. The repository 220 may store various data models and data definitions that may be referenced during query execution. For example, the repository 220 may store an analytic data model (ADM) 230, a source data model (SDM) 240, a processing model 250, and a content model 290.

The SDM 240 may define a maximal set of dimensions and fact tables that can be constructed from a particular client data set (e.g., the client data 280). A dimension may be a field that can be placed on an axis of a multidimensional data cube that is used to execute a query, as further described herein. For example, "Location" may be a dimension, and members of the "Location" dimension may include "US," "UK," and "Canada." It should be noted that there may be multiple levels of a dimension. For example, the "US" dimension may include a second level that includes the members "Texas," "New York," and "California." A fact table may be a collection of facts, where facts correspond to data points (e.g., database entries) and occupy the cells of a multidimensional data cube.

In addition to dimensions and fact tables, the SDM 240 may include fact table templates 242, calculated values 244, and cube measures 246 (alternately referred to as "fact table measures"). The fact table templates 242 may define a maximal set of dimensions, measures, and calculated values that can be used to construct a particular multidimensional data cube. The calculated values 244 may be represented by functions that accept a fact as input and output a calculated value to be appended to that fact. For example, given the value "Salary" in a fact table, a "Ten times Salary" calculated value may append a value to each fact equal to ten times the value of the "Salary" of that fact. As another example, "Tenure" may be a calculated value that does not exist in the client data 280 as a static value. Instead, a "Tenure" calculated value may accept an employee hire date and a specified date as input and may return a value representing the employee's tenure on the specified date. The cube measures 246 may be functions that accept a set of facts as input and output a value. For example, given all employees in Canada as an input, a "Sum of Salary" measure may output the sum of salaries of all Canadian employees. As another example, a "Count" measure may count all of the facts in a set of cells and return the count. Measures that represent a performance assessment (e.g., key performance indicators (KPIs)) are also referred to herein as metrics.

The ADM 230 may include analytic concepts 232 and an analytic model 234. The analytic concepts 232 may be functions that accept an application context as input and output a set of dimension members. In a particular embodiment, application context may be dynamically adjusted by a user, as further described with reference to FIG. 5. The analytic model 234 may represent a set of mathematical formulae that can be used during query execution, as further described herein.

The processing model 250 may include query definitions 252, application data 254, function declarations 256, and security data 258. Each query may be associated with a query definition 252 that includes a set of function calls, measures, and parameter values. The query definition 252 may thus define an execution path to be used by the analytic processor 218 to generate the result of the query. In a particular embodiment, queries may be classified as analytic queries or data connectors. Analytic queries may not be executable until all required fact tables are available. In contrast, data connector queries may be executed independent of fact table availability and may be used to populate fact tables. For example, a data connector query may be executed to load data into in-memory data storage 270 from a database, a web service, a spreadsheet, etc.

To illustrate, "Cost of Turnover" may be a business concept corresponding to a sequence of operations that returns a scalar value as a result. A "Cost of Turnover" query may accept the result of a "Turnover" query as input, and the "Turnover" query may accept an "Organization" and a "Date Range" as input. Thus, a query that computes the Cost of Turnover for a Product Organization during the 2011-2012 year is $373,000 may be represented as:

Cost of Turnover(Turnover(Organization("Product", "2011-2012")))=$373,000 where "Product" and "2011-2012" are parameters and "Organization" and "Turnover" are analytic queries. Thus, higher-order business concepts, such as "Cost of Turnover," may be bound to queries that can be chained together. The query definitions 252 may include definitions for lower-order and higher-order queries.

The application data 254 may be maintained for each client instance (e.g., the client instances 112 of FIG. 1). The application data 254 for a specific client instance may include server configurations and security policies for the client instance. The application data 254 for a specific client instance may also include a source data model, an analytic data model, and a processor model for the client instance. When the client instance is initialized by a user, the analytics engine 200 may use the application data 254 for the client instance and for the user to determine what databases are available and what data (e.g., from client data 280) should be loaded into the in-memory data storage 270 by data connector queries.

The function declarations 256 may be associated with functions called by the analytic processor 218. For example, the functions may include data transformations or aggregation functions, such as functions to execute a formula, to execute a computation over data representing a calendar year, etc. The functions may also include fetch functions, such as structured query language (SQL) fetch, web service fetch, spreadsheet fetch, etc. The functions may further include exporting functions, such as spreadsheet export and SQL export, and custom (e.g., user defined) functions.

The security data 258 may be used to implement query security and organizational security. In a particular embodiment, to implement query security, each measure (e.g., cube measure 246 and/or content measure 294) may be bound to one or more queries, and each user may have a particular security level and/or enterprise role. Different measures may have different minimum required security levels and/or enterprise roles. Prior to execution of a query, the analytic processor 218 may access the security data 258 to determine whether the user requesting execution of the query meets a security level/enterprise role required to access the measures bound to the query. If the user does not meet the security requirements, the analytics engine 200 may return an error message to the requesting client instance.

Organizational security may be applied on the basis of the organization(s) that a user has access to. For example, the manager of the "Products" organization may have access to products-related information, but may not have access to a "Legal" organization. The security data 258 may indicate that a user has access to information for the user's organization and organizations descending from the user's organization.

For mapped dimensions, measures, and calculated values, the security of each such object may be equivalent to a user's security access to the underlying data in a mapped fact table/cube.

The content model 290 may include definitions 292 for topics and metrics. For example, in the context of workforce analytics, the definitions 292 may include definitions for various human resources (HR) topics and metrics, as well as definitions for questions and analytic concepts associated with such topics and metrics. The content model 290 may also include definitions for content measures 294. Whereas the cube measures 246 are defined with respect to a cube, the content measures 294 may be derived from or built upon a cube measure. For example, given the "Sum of Salary" cube measure described above, a "Sum of Salaries of Employees 50 years or older" content measure can be derived from or built upon the "Sum of Salary" cube measure. Various topics, metrics, and/or questions defined in the definitions 292 may reference the "Sum of Salaries of Employees 50 years or older" content measure.

Figure 3:
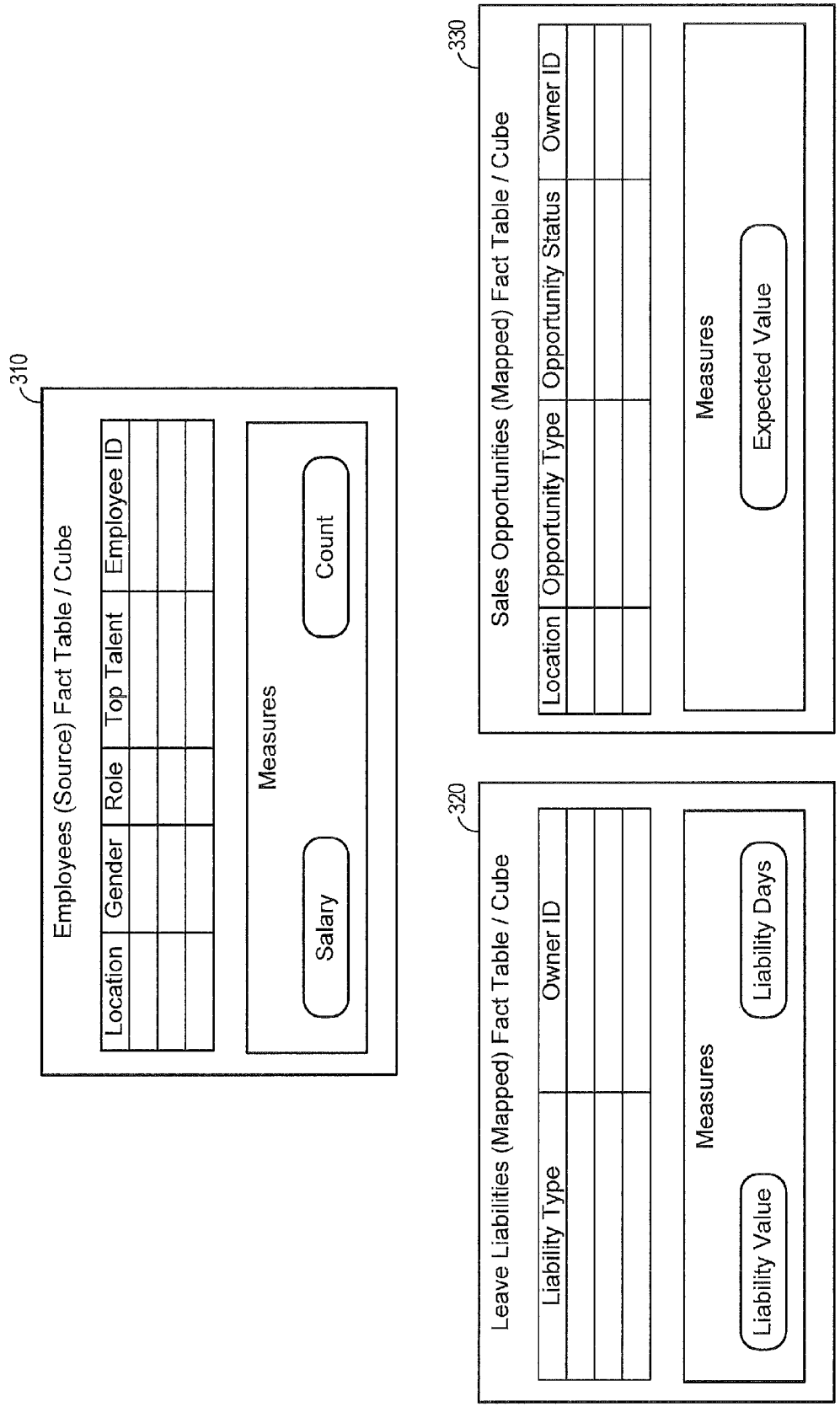
FIG. 3 illustrates a particular embodiment of a source fact table and mapped fact tables.

In a particular embodiment, the repository 220 may include mappings between a source fact table/cube (e.g., the Employees fact table/cube 310 of FIG. 3) and one or more mapped fact tables/cubes (e.g., the Leave Liabilities fact table/cube 320 of FIG. 3 and the Sales Opportunities Fact Table/Cube 330 of FIG. 3). To illustrate, the mappings may include the mapped dimensions, mapped measures, and calculated values corresponding to the mapped measures.

The calculator 260 may include a function engine 262, an analytic concept builder 264, an aggregator 266, a cube manager 268, and the in-memory data storage (e.g., random access memory (RAM)) 270. The function engine 262 may be used by the analytic processor 218 to load and execute the functions 256. In a particular embodiment, the function engine 262 may also execute user-defined functions or plugins. A function may also recursively call back to the analytic processor 218 to execute sub-functions.

When a query requires a set of values corresponding to different dates (e.g., to generate points of a trend chart), the function engine 262 may split a query into sub-queries. Each sub-query may be executed independently. Once results of the sub-queries are available, the function engine 262 may combine the results to generate an overall result of the original query (e.g., by using a "UnionOverPeriod" function). The overall result may be returned to the requesting client instance via the server management module 210.

The analytic concept builder 264 may be a processing function called by the analytic processor 218 to communicate with the calculator 260. If a particular query cannot be evaluated using a single multidimensional cube operation, the query may be split into smaller "chunk" requests. Each chunk request may be responsible for calculating the result of a chunk of the overall query. The analytic concept builder 264 may call back to the analytic processor 218 with chunk requests, and the calculator 260 may execute the chunk requests in parallel. Further, when a large amount of client data 280 is available, the client data 280 may be divided into "shards." Each shard may be a subset of the client data 280 that matches a corresponding filter (e.g., different shards may include data for different quarters of a calendar year). Shards may be stored on different storage devices (e.g., servers) for load-balancing purposes. If a query requests values that span multiple shards (e.g., a query that requests data for a calendar year), the analytic concept builder 264 may split the query into chunk requests and call back into the analytic processor 218 with a chunk request for each shard.

The cube manager 268 may generate, cache, and lookup cube views. A "cube view" includes a multidimensional cube along with one or more constraints that provide semantics to the cube. For example, given a cube containing employee information, the constraint "Date=2012-07-01" can be added to the cube to form a cube view representing the state of all employees as of Jul. 1, 2012. The cube manager 268 may receive a request for a particular cube view from the analytic concept builder 264. If the requested cube view is available in the cache, the cube manager 268 may return the cached cube view. If not, the cube manager 268 may construct and cache the cube view prior to returning the constructed cube view. A cache management policy (e.g., least recently used, least frequently used, etc.) may be used to determine when a cached cube view is deleted from the cache.

The analytic concept builder 264 may also call into the aggregator 266. When called, the aggregator 266 may determine what cube views, dimensions member(s), and measures are needed to perform a particular calculation. The aggregator 266 may also calculate results from cube views and return the results to the analytic concept builder 264.

The in-memory data storage 270 may store client data 280 for use during query execution. For example, the client data 280 may be loaded into the in-memory data storage 270 using data connector queries called by the analytic processor 218. The in-memory data storage 270 can be considered a "base" hypercube that includes a large number of available dimensions, where each dimension can include a large number of members. In an exemplary embodiment, the base cube is an N-dimensional online analytic processing (OLAP) cube.

During operation, the analytics engine 200 may execute queries in response to requests from client instances. For example, a user may log in to a client instance and navigate to a report that illustrates Turnover Rate for a Products organization in Canada during the first quarter of 2011. The client instance may send a query request for a "Turnover Rate" analytic query to be executed using the parameters: "Products," "Canada," and "First Quarter, 2011." The server management module 210 may receive the query request and may forward the query request to the analytic processor 218.

Upon receiving the query request, the analytic processor 218 may verify that the user has access to the Turnover Rate query and employee turnover data for the Products organization in Canada. If the user has access, the analytic processor 218 may verify that the employee turnover data is stored in the in-memory data storage 270. If the employee turnover data is not stored in the in-memory data storage 270, the analytic processor 218 may call one or more data connector queries to load the data into the in-memory data storage 270.

When the data is available in the in-memory data storage, the analytic processor 218 may look up the definition of the Turnover Rate query in the repository 220. For example, the definition of the Turnover Rate query may include a rate processing function, an annualization processing function, a sub-query for the number of turnovers during a time period, and a sub-query for average headcount during a time period. The function engine 262 may load the rate and annualization processing functions identified by the query definition.

Once the functions are loaded, the analytic processor 218 may call the analytic concept builder 264 to generate cube views. For example, the analytic concept builder 264 may request the cube manager 268 for cube views corresponding to headcount and turnover count. The cube manager 268 may retrieve the requested cube views from the cache or may construct the requested cube views.

The analytic concept builder 264 may execute analytic concepts and call into the aggregator 266 to generate result set(s). For the Turnover Rate query, two result sets may be generated in parallel—a result set for average head count and a result set for number of turnover events. For average headcount, the aggregator 266 may call a measure to obtain four result values based on the "Canada" member of the Locations dimension, the "Products" member of the organizations dimension, and "2010-12-31," "2011-01-31," "2011-02-28," and "2011-03-31" of the time dimension. The four result values may represent the headcount of the Products Organization in Canada on the last day of December 2010, January 2011, February 2011, and March 2011. The aggregator 266 may pass the four values to the analytic concept builder 264. To illustrate, the four values may be headcount=454, headcount=475, headcount=491, and headcount=500.

Similarly, for turnover count, the aggregator 266 may call a measure to obtain a result value based on the "Canada" member of the Locations dimension, the "Products" member of the organizations dimension, and "2011-01," "2011-02," and "2011-03" of the time dimension. The three result values may represent the total number of turnover events in the Products Organization in Canada during the months of January 2011, February 2011, and March 2011. The aggregator 266 may pass a sum of the result values to the analytic concept builder 264. To illustrate, the result value may be sum=6.

The analytic concept builder 264 may pass the received values to the analytic processor 218, which may call processing functions to calculate the query result. For example, the analytic processor 218 may call the rate processing function to determine the rate is 1.25% (turnover/average head count=6/480=0.0125). The analytic processor 218 may then call the annualization processing function to determine that the annualized turnover rate is 5% (1.25%*4 quarters=5%). The analytic processor 218 may return the query result of 5% to the client instance via the server management module 210.

It should be noted that the foregoing description, which relates to executing an analytic query to generate a single value, is for example only and not to be considered limiting. Multidimensional queries may also be executed by the analytics engine 200. For example, a user may set his or her application context to "All Organizations" in "Canada" during "2011." The user may then view a distribution chart for Resignation Rate and select groupings by "Age," "Location," and "Gender." To generate the chart, a multidimensional query may be executed by the analytics engine 200. Thus, queries may be executed to retrieve a set of data (e.g., multiple data items), not just a single value.

In a particular embodiment, the analytics engine 200 is configured to perform multidimensional computations on client data 280 based on mappings between source client data and mapped client data. For example, as described with reference to FIG. 1, the analytics engine 200 may receive a query that identifies a source cube, a mapped measure, and one or more classification values (e.g., slices and/or axes). The analytics engine 200 may generate a cell set, where each cell corresponds to a different unique combination of the classification values. The analytics engine 200 may then map facts from the source cube to the cells of the cell set and evaluate the mapped measure for the facts in each cell (e.g., based on the formulae added to the source table/cube during the mapping process).

FIG. 2 thus illustrates a server-side system that is operable to generate mappings (e.g., one-to-many mappings) between data in different fact tables/cubes and to execute queries based on such mappings.

Figure 5:
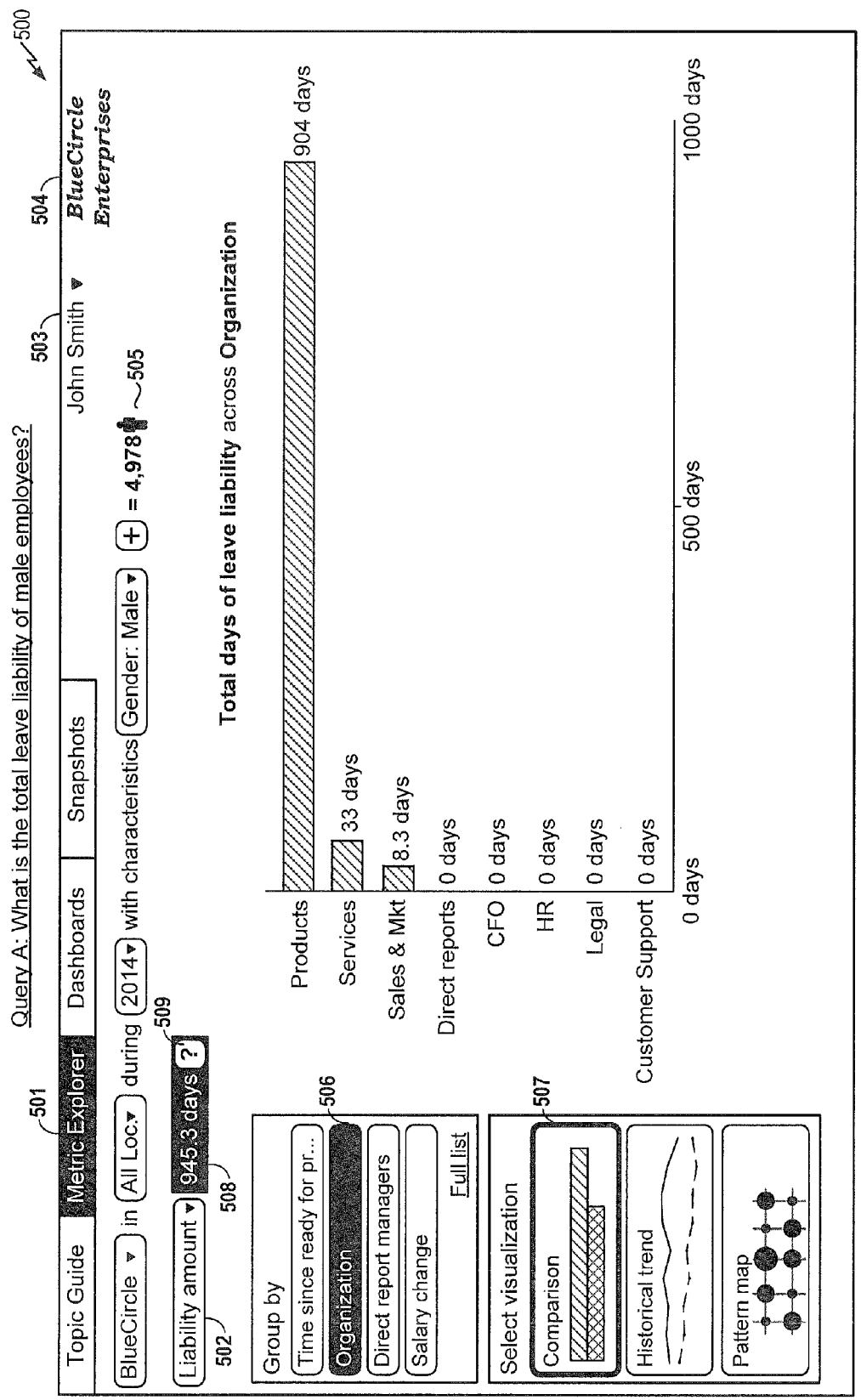
FIG. 5 illustrates a first particular embodiment of a graphical user interface (GUI) that is generated by the system of FIG. 1.

Illustrative examples of executing Queries A-D from Tables 1 and 2, above, are now described with reference to FIGS. 5-9. Referring to FIG. 5, an illustrative embodiment of a graphical user interface (GUI) 500 that may be generated by the client instance 112 is shown. The GUI 500 corresponds to Query A: "What is the total leave liability of male employees?"

In the GUI 500, a metric explorer tab 501 is selected. The metric explorer may present a list of metrics 502 that are available for analysis and query generation. In the example of FIG. 5, the user is John Smith (as indicated at 503), who is an employee of the company BlueCircle Enterprises (as indicated at 504). The GUI 500 also indicates an application context 505, also referred to herein as a "global context." The application context 505 may be used to define one or more filtering values (e.g., slices) and/or one or more grouping values (e.g., axes) that are included in a query, as described with reference to FIG. 1.

To execute Query A, the user may use the GUI 500 to formulate a query that indicates the Employees table 310 of FIG. 3 as a source table. The query may also indicate a "Sum" of the mapped measure "EmployeesLeaveLiabilities.Liability Value" of FIG. 4 in response to the user selecting the metric "Liability amount," as shown. The query may further indicate a slice "Gender=Male" based on the application context 505. In FIG. 5, the application context 505 is "BlueCircle" in "All Locations" during the year 2014, with the characteristic Gender=Male. The application context 505 corresponds to a population of 4,978. As the user changes the application context 505 (e.g., changes the "Location" dimension from "All Locations" to "US," changes the "Organization" dimension from "BlueCircle" to "Legal," etc.), the population may be dynamically updated. In the example of FIG. 5, the user has also elected to group query execution results by organization, as indicated at 506 (e.g., the query may include "All Organization" as a grouping value). The user has also elected to view a comparison visualization (e.g., a bar chart), as indicated at 507. Other types of available visualizations may include historical trend (e.g., line chart), pattern map, distribution (e.g., multidimensional bar chart), and movement (e.g., incoming/outgoing) as illustrative, non-limiting examples.

Upon receiving Query A, the analytics engine (e.g., the analytics engine 130 of FIG. 1 or the analytics engine 200 of FIG. 2) may execute Query A to generate the query execution results shown in the bar chart of FIG. 5. For example, the analytics engine may generate a cell set and may determine whether each employee belongs to any of the cells in the cell set. During the mappings of employees to cells, slicing values pertaining to the source cube may be applied. For example, the slicing value "Gender=Male" may filter out non-male employees, so non-male employees may not be added to any of the cells in the cell set.

The analytics engine may then execute the EmployeesLeaveLiabilities.LiabilityValue measure on each cell. For each cell, executing the EmployeesLeaveLiabilities.LiabilityValue measure on the cell may include executing the Liability Value measure on the Leave Liabilities table/cube for OwnerIDs in the Leave Liabilities cube that match Employee IDs of the employees in the cell. It should be noted that the total liability value for each employee may be based on multiple facts in the Leave Liabilities cube (e.g., an employee may have vacation leave liability, sick leave liability, banked overtime leave liability, etc.). During the execution of a mapped measure on the mapped cube, slicing values pertaining to the mapped cube may be applied. As an example, although Query A does not include such a slicing value, if Query A included a slicing value "Mapped.LiabilityType=Sick Leave," then the Liability Value measure may be executed on the Leave Liabilities cube using "Liability Type=Sick Leave" as a filter. Thus, filters corresponding to the source cube may be applied on the "front end" during cell set generation/population, whereas filters corresponding to a mapped cube may be applied on the "back end" during execution of mapped measures.

For the example of FIG. 5, the cell set is a one-dimensional cell set including cells for the Products, Services, Sales & Mkt, Direct reports, CFO, HR, Legal, and Customer Support organizations. The computed values of the EmployeesLeaveLiabilities.LiabilityValue measure for the cells are 904 days, 33 days, 8.3 days, 0 days, 0 days, 0 days, 0 days, and 0 days, respectively. The total leave liability of male employees, i.e., the answer to Query A, is 900 days+33 days+8.3 days=945.3 days, as shown at 508.

In a particular embodiment, different operations during execution of a query, such as Query A, may be performed by different devices (e.g., different servers, cloud computing servers, etc.). For example, operations performed with respect to the Employees cube (e.g., cell set generation, filtering out non-male employees, etc.) may be performed by a first server and execution of measures on the Leave Liabilities cube may be performed by a different server. The described techniques may thus enable distributed computation of multi-cube queries.

In a particular embodiment, the described techniques enable "drillthrough" queries to view underlying data (e.g., facts) from multiple cubes on a single interface. For example, the user may drillthrough to see the employees and leave liabilities that resulted in the total leave liability amount of 945.3 days by selecting (e.g., clicking on) the question mark (?) indicated at 509. In response to selection of the question mark, a GUI 600 of FIG. 6 may be shown. The GUI 600 includes a list of the underlying employees whose leave liabilities contributed to the total leave liability amount of 945.3 days. Because Query A includes a slicing value "Gender=Male," all of the employees shown in FIG. 6 are male. In response to selection of an employee (e.g., Brendon Abbot in FIG. 6), the GUI 600 displays data about the selected employee. In particular, the data includes data from both the Employee cube (e.g., Employee ID, Salary, etc.) and the Leave Liabilities cube (e.g., Vacation, Banked Overtime, etc.). The described techniques may thus enable a user to see underlying data from multiple cubes when executing a multi-cube query, which may help the user better understand query execution results.

In a particular embodiment, a "drilldown" operation may be performed by selecting a particular bar of the bar chart in FIG. 5. For example, when the user selects the "Products" bar in the bar chart, the GUI 500 may change the y-axis of the bar chart to display sub-organizations within the Products organization. To illustrate, the sub-organizations may include "R&D," "Manufacturing," etc. Further, the data displayed in the bar chart may be automatically updated (e.g., to display leave liability amounts corresponding to the R&D sub-organization, the Manufacturing sub-organization, etc.).

Figure 7:
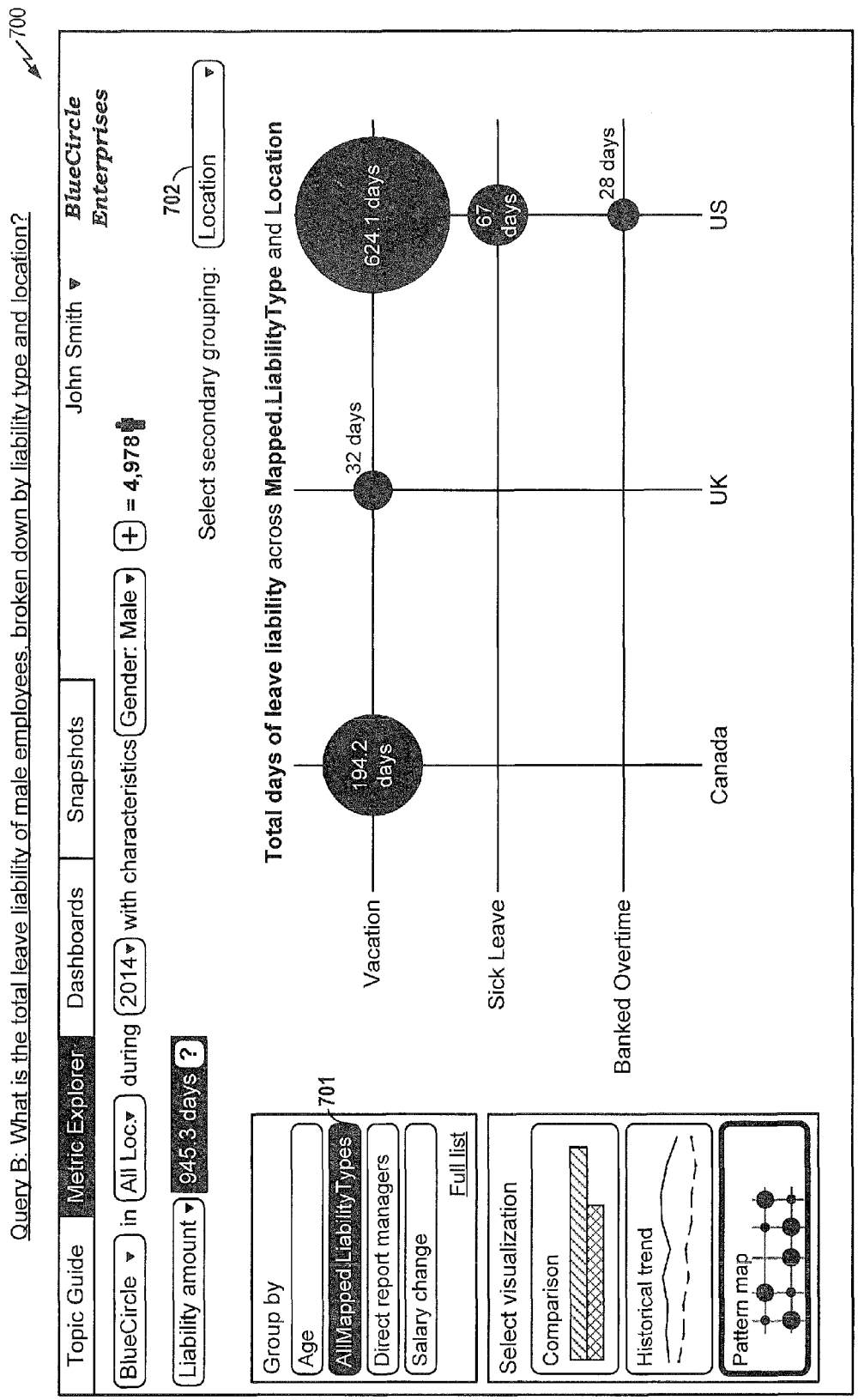
FIG. 7 illustrates a third particular embodiment of a GUI that is generated by the system of FIG. 1.

Referring to FIG. 7, an illustrative embodiment of a GUI 700 that may be generated by the client instance 112 is shown. The GUI 700 corresponds to Query B: "What is the total leave liability of male employees, broken down by liability type and location?"

To execute Query B, the user may use the GUI 700 to formulate a query that indicates the Employees table, the mapped measure "Sum of EmployeesLeaveLiabilities.LiabilityValue," the slice "Gender=Male" and the axes "All Locations" and "All Mapped.LiabilityTypes." In the example of FIG. 7, the slice "Gender=Male" is selected using the application context, the y-axis "All Mapped.LiabilityTypes" is selected at 701, and the x-axis "All Locations" is selected at 702.

Upon receiving Query B, the analytics engine (e.g., the analytics engine 130 of FIG. 1 or the analytics engine 200 of FIG. 2) may execute Query B to generate the query execution results shown in the pattern map of FIG. 7, in which locations are on the x-axis and liability types are on the y-axis. The analytics engine may generate a cell set, map employees to cells while filtering out non-male employees, and execute the EmployeesLeaveLiabilities.LiabilityValue measure on each cell, as described with reference to FIG. 5. In contrast to FIG. 5, the cell set for FIG. 7 is a two-dimensional cell set including the following cells: (Vacation, Canada), (Vacation, UK), (Vacation, US), (Sick Leave, Canada), (Sick Leave, UK), (Sick Leave, US), (Banked Overtime, Canada), (Banked Overtime, UK), and (Banked Overtime, US). The computed values of the EmployeesLeaveLiabilities.LiabilityValue measure for the cells are 194.2 days, 32 days, 624.1 days, 0 days, 0 days, 67 days, 0 days, 0 days, and 28 days, respectively.

Figure 8:
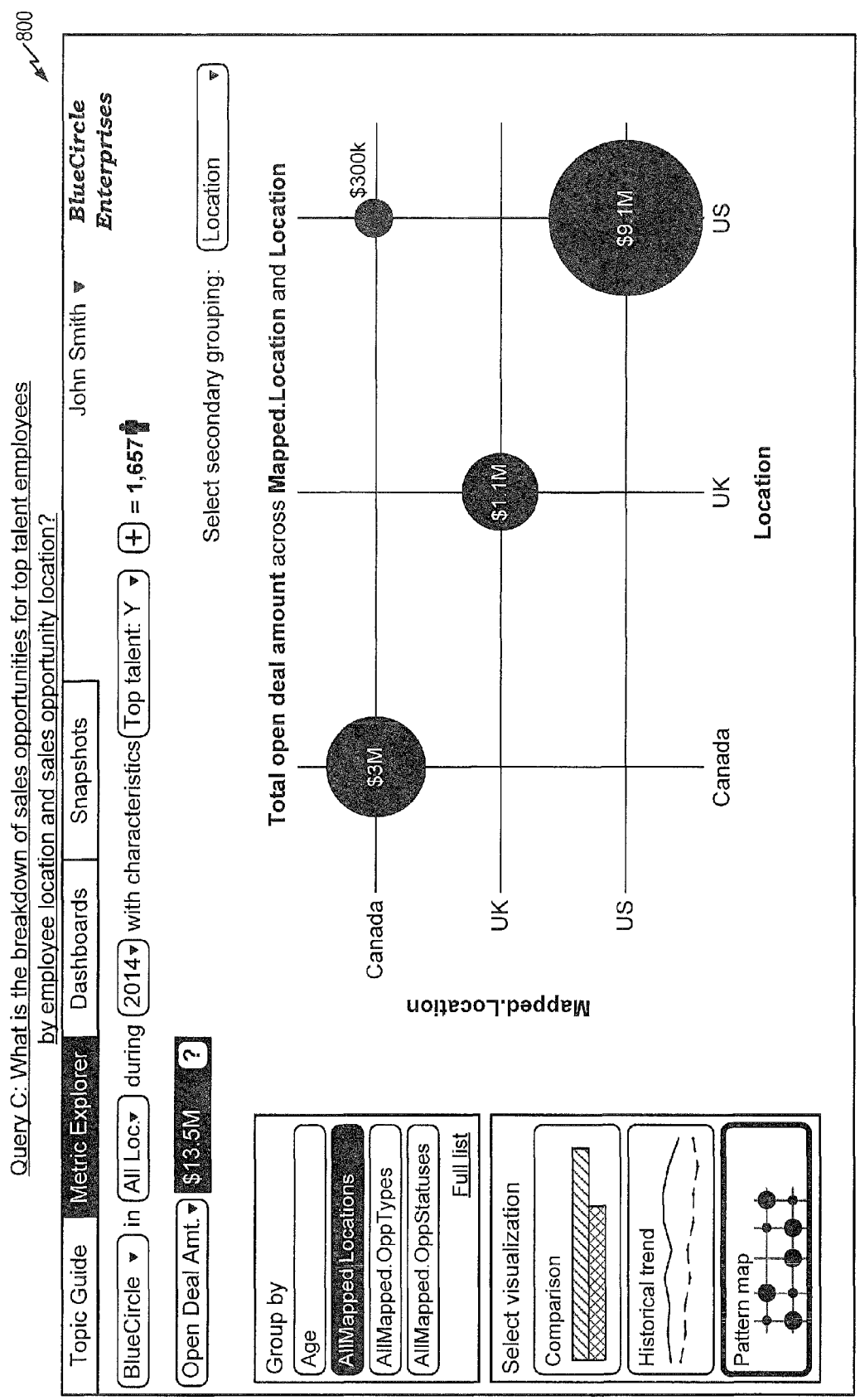
FIG. 8 illustrates a fourth particular embodiment of a GUI that is generated by the system of FIG. 1.

Referring to FIG. 8, an illustrative embodiment of a GUI 800 that may be generated by the client instance 112 is shown. The GUI 800 corresponds to Query C: "What is the breakdown of sales opportunities for top talent employees by employee location and sales opportunity location?"

To execute Query C, the user may use the GUI 800 to formulate a query that indicates the Employees table, the mapped measure "Sum of EmployeesSalesOpportunities.ExpectedValue," the slice "Top Talent=Y," and the axes "All Locations" and "All Mapped.Locations." Thus, FIG. 8 illustrates an example in which the same conceptual dimension, Location, is used to filter both the source employees cube as well as the mapped facts sales opportunities cube.

Upon receiving Query C, the analytics engine (e.g., the analytics engine 130 of FIG. 1 or the analytics engine 200 of FIG. 2) may execute Query C to generate the query execution results shown in the pattern map of FIG. 8, in which employee locations are on the x-axis and sales opportunity locations are on the y-axis.

Figure 9:
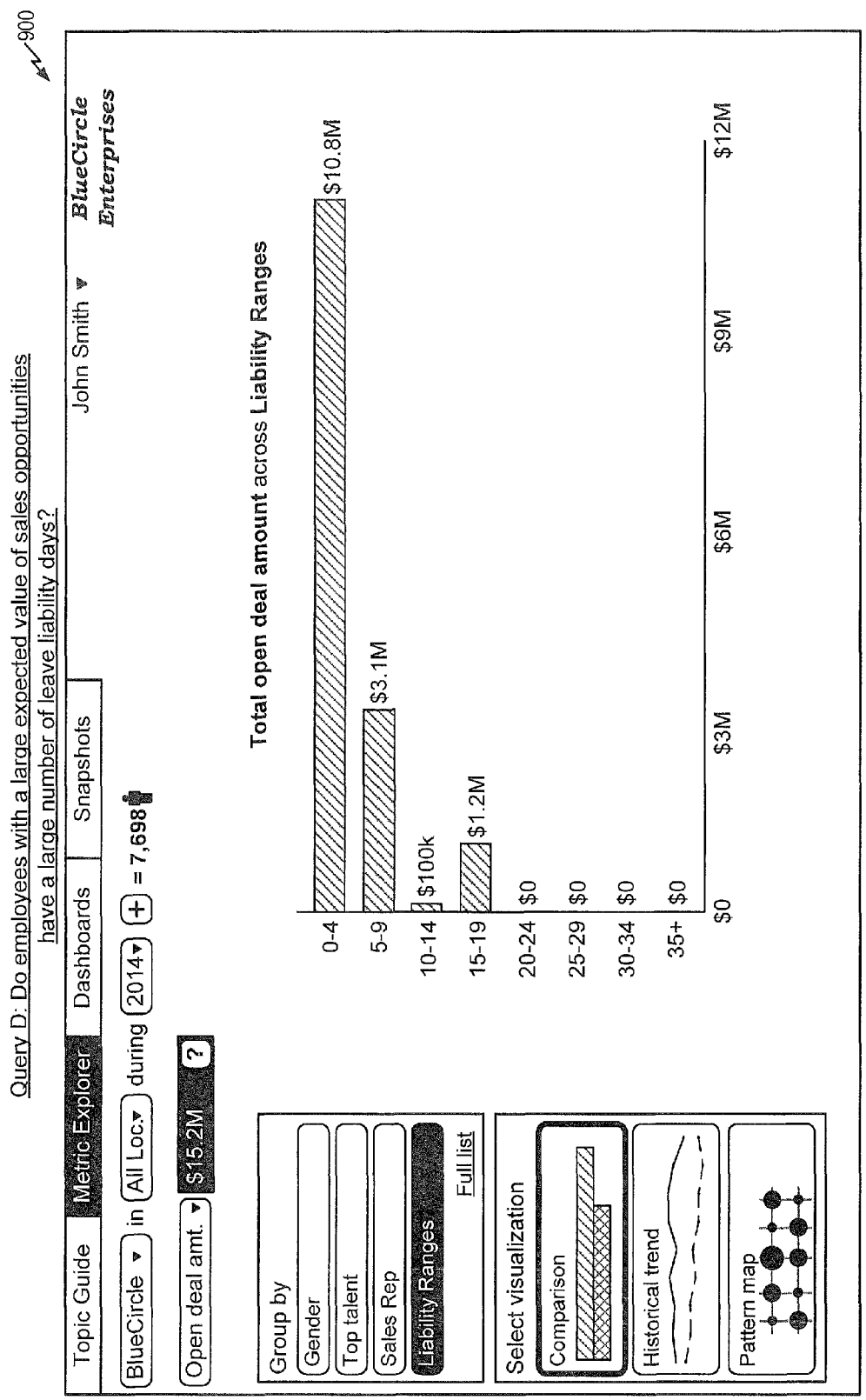
FIG. 9 illustrates a fifth particular embodiment of a GUI that is generated by the system of FIG. 1.

Referring to FIG. 9, an illustrative embodiment of a GUI 900 that may be generated by the client instance 112 is shown. The GUI 900 corresponds to Query D: "Do employees with a large expected value of sales opportunities have a large number of leave liability days?" Thus, in contrast to the GUIs of FIGS. 5-8, the GUI 900 of FIG. 9 pertains to a query that involves multiple mapped cubes (e.g., both the Leave Liabilities mapped cube and the Sales Opportunities mapped cube).

To execute Query D, the user may use the GUI 900 to formulate a query that indicates the Employees table, the mapped measures "Sum of EmployeesSalesOpportunities.ExpectedValue," and the axes "Ranges of EmployeesLeaveLiabilities.LiabilityDays."

Upon receiving Query D, the analytics engine (e.g., the analytics engine 130 of FIG. 1 or the analytics engine 200 of FIG. 2) may execute Query D to generate the query execution results shown in the bar chart of FIG. 9.

FIGS. 5-9 thus illustrate GUIs that may be used to formulate complex multi-cube queries and to view the results of executing such queries. Advantageously, the fact that the query formulation and execution involves multiple data sources (e.g., fact tables/cubes) may be transparent to the user. Thus, the user may continue to assume that he or she is working with an "Employees" data set, even when viewing Leave Liabilities data or Sales Opportunity Data. The described techniques may thus enable multi-cube query formulation and execution without increasing user-perceived complexity.

Figure 10:
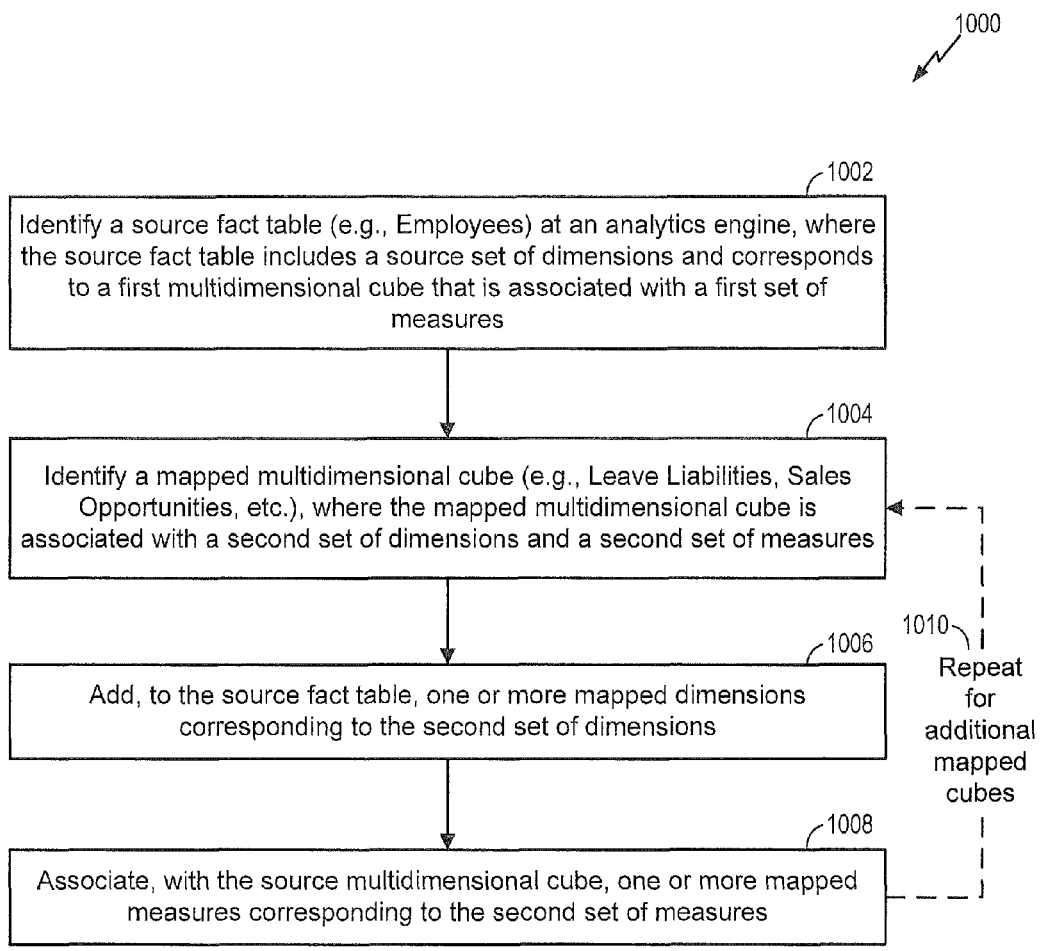
FIG. 10 is a flowchart that illustrates a first particular embodiment of a method of operation at an analytics engine.

Referring to FIG. 10, a flowchart illustrating a particular embodiment of a method 1000 of operation at an analytics engine is shown. In an illustrative embodiment, the method 1000 may be performed by the analytics engine 130 of FIG. 1 or the analytics engine 200 of FIG. 2.

The method 1000 includes identifying a source fact table at an analytics engine, at 1002. The source fact table includes a first set of dimensions and corresponds to a source multidimensional cube that is associated with a first set of measures. For example, the analytics engine may identify the Employees table 310 of FIG. 3 as the source fact table. In an illustrative embodiment, the Employees table 310 may be identified as the source fact table based on mapping information (e.g., a mapping file) that indicates that the Employees table 310 is the source fact table. Alternately, the Employees table 310 may be identified as the source fact table based on the Employees table 310 being an earliest-created fact table, having a largest number of rows, having a largest number of dimensions, having a largest number of associated measures, etc.

The method 1000 also includes identifying a mapped multidimensional cube, at 1004. The multidimensional cube is associated with a second set of dimensions and a second set of measures. For example, the analytics engine may identify the Leave Liabilities cube 320 of FIG. 3 or the Sales Opportunities cube 330 of FIG. 3 as the mapped multidimensional cube. In an illustrative embodiment, a cube that are is not the source cube may automatically be identified as a mapped cube based on having a dimension (e.g., "Owner ID") that corresponds to a mapping key dimension of the source fact table (e.g., "Employee ID"). Alternately, mapped cubes may be identified by mapping information (e.g., a mapping file).

The method 1000 further includes adding, to the source fact table, one or more mapped dimensions corresponding to the second set of dimensions, at 1006. For example, as shown in FIG. 4, the analytics engine may add mapped dimensions from the Leave Liabilities fact table and the Sales Opportunities fact table to the Employees fact table. To illustrate, the analytics engine may add the mapped dimensions "Mapped.LiabilityType," "Mapped.Location," etc.

The method 1000 includes associating, with the source multidimensional cube, a one or more mapped measures corresponding to the second set of measures, at 1008. For example, as shown in FIG. 4, the analytics engine may add mapped measures such as "EmployeesLeaveLiabilities.LiabilityValue," "EmployeesLeaveLiability.LiabilityDays," and "EmployeesSalesOpportunities.ExpectedValue." The method 1000 may be repeated for additional mapped cubes, as shown at 1010.

The method 1000 of FIG. 10 may thus generate mappings between data and measures associated with different fact tables/cubes. The generated mappings may be used to execute complex, multi-cube queries, as further illustrated in FIG. 11.

Figure 11:
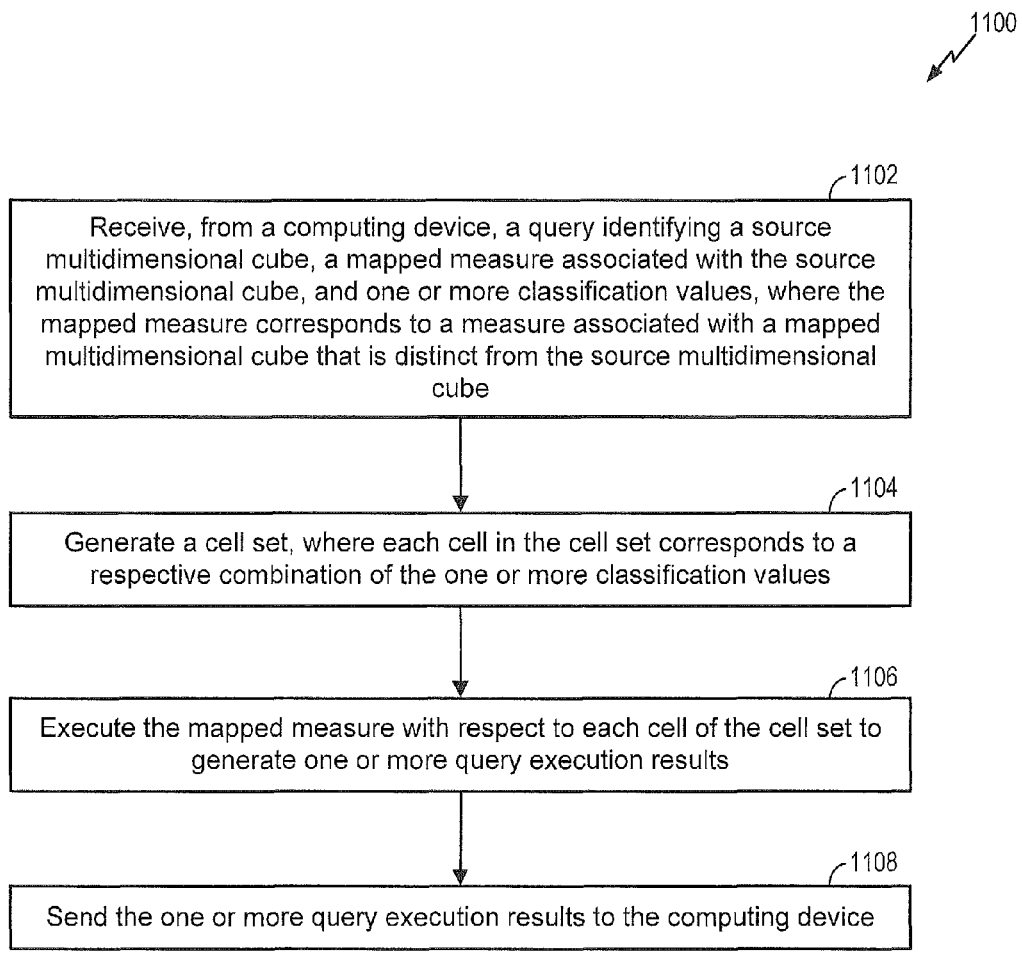
FIG. 11 is a flowchart that illustrates a second particular embodiment of a method of operation at an analytics engine.

Referring to FIG. 11, a flowchart illustrating another particular embodiment of a method 1100 of operation at an analytics engine is shown. In an illustrative embodiment, the method 1100 may be performed by the analytics engine 130 of FIG. 1 or the analytics engine 200 of FIG. 2.

The method 1100 includes receiving, from a computing device, a query identifying a source multidimensional cube, a mapped measure associated with the source multidimensional cube, and one or more classification values, at 1102. The mapped measure corresponds to a measure associated with a mapped multidimensional cube that is distinct from the source multidimensional cube. For example, during the execution of Query A as described with reference to FIG. 5, the analytics engine may receive a query that identifies the Employees cube, "Sum of EmployeesLeaveLiabilities.LiabilityValue," and "Gender=Male."

The method 1100 also includes generating a cell set, where each cell in the cell set corresponds to a respective combination of the one or more classification values, at 1104. For example, during the execution of Query A as described with reference to FIG. 5, the cell set is a one-dimensional cell set including cells for the Products, Services, Sales & Mkt, Direct reports, BlueCircle, CFO, HR, Legal, and Customer Support organizations. The analytics engine may then "populate" the cell set by including the male employees of each organization in the corresponding cell while filtering out non-male employees.

The method 1100 further includes executing the mapped measure with respect to each cell of the cell set to generate the one or more query execution results, at 1106. For example, during the execution of Query A as described with reference to FIG. 5, the analytics engine may then execute the EmployeesLeaveLiabilities.LiabilityValue measure on each cell. For each cell, executing the EmployeesLeaveLiabilities.LiabilityValue measure on the cell may include executing the Liability Value measure on the Leave Liabilities table/cube for OwnerIDs in the Leave Liabilities cube that match Employee IDs of the employees in the cell. In the example of FIG. 5, the query execution results for the cells are 904 days, 33 days, 8.3 days, 0 days, 0 days, 0 days, 0 days, and 0 days, respectively.

The method 1100 includes sending the one or more query execution results to the computing device, at 1108. In an illustrative embodiment, the query execution results may be used to generate a visualization, such as the bar char visualization of FIG. 5. The method 1100 may thus enable execution of complex, multi-cube queries.

It will be appreciated that the systems and methods described herein may offer several advantages and benefits. For example, adding calculated values that are based on measures from mapped cubes enables multi-cube calculations such as dividing a sum of leave liability values for an employee by the employee's salary. As another example, the same dimension may be used to independently filter both the base cube and the mapped cube (e.g., to examine London sales opportunities for American salespeople). Further, content creators, such as human resources (HR) or information technology (IT) personnel at an enterprise, may not need to be informed that they are working with anything other than the base employees data set, which alleviates possible confusion stemming from having to deal with multiple data cubes when formulating queries. In addition, the described mapping can be achieved by creating a single "fact table mapping" object to relate dimensions and measures from one cube to another, which may be simpler than defining relationships for each individual dimension.

In accordance with various embodiments of the present disclosure, the methods, functions, and modules described herein may be implemented by software programs executable by a computer system. Further, in exemplary embodiments, implementations can include distributed processing, component/object distributed processing, and parallel processing. Alternatively, virtual computer system processing can be used to implement one or more of the methods or functionality as described herein.

Particular embodiments can be implemented using a computer system executing a set of instructions that cause the computer system to perform any one or more of the methods or computer-based functions disclosed herein. A computer system may include a laptop computer, a desktop computer, a mobile phone, a tablet computer, or any combination thereof. The computer system may be connected, e.g., using a network, to other computer systems or peripheral devices. For example, the computer system or components thereof can include or be included within any one or more of the devices, systems, modules, and/or components illustrated in or described with reference to FIGS. 1-11. In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in one or more computer-readable or a processor-readable devices, such as a centralized or distributed database, and/or associated caches and servers. The terms "computer-readable device" and "processor-readable device" also include device(s) capable of storing instructions for execution by a processor or causing a computer system to perform any one or more of the methods or operations disclosed herein. Examples of such devices include, but are not limited to, random access memory (RAM), flash memory, read-only memory (ROM), programmable read-only memory (PROM), erasable programmable read-only memory (EPROM), electrically erasable programmable read-only memory (EEPROM), register-based memory, solid-state memory, a hard disk, a removable disk, a disc-based memory (e.g., compact disc read-only memory (CD-ROM)), or any other form of storage device. A computer-readable or processor-readable device is not a signal.

In a particular embodiment, an analytics engine includes a processor and a memory storing instructions that, when executed by the processor, cause the processor to perform operations including identifying a source fact table. The source fact table includes a first set of dimensions and corresponds to a source multidimensional cube that is associated with a first set of measures. The operations also include identifying a mapped multidimensional cube, where the mapped multidimensional cube is associated with a second set of dimensions and a second set of measures. The operations further include adding, to the source fact table, one or more mapped dimensions corresponding to the second set of dimensions. The operations include associating, with the source multidimensional cube, one or more mapped measures corresponding to the second set of measures.

In another particular embodiment, a method includes receiving, at a server from a computing device, a query identifying a source multidimensional cube, a mapped measure associated with the source multidimensional cube, and one or more classification values. The mapped measure corresponds to a measure associated with a mapped multidimensional cube that is distinct from the source multidimensional cube. The method also includes generating a cell set, where each cell of the cell set corresponds to a respective combination of the one or more classification values. The method further includes executing the mapped measure with respect to each cell of the cell set to generate one or more query execution results and sending the one or more query execution results to the computing device.

In another particular embodiment, a computer-readable storage device stores instructions that, when executed by a processor, cause the processor to perform operations including identifying a source fact table. The source fact table includes a first set of dimensions and corresponds to a source multidimensional cube that is associated with a first set of measures. The operations also include identifying a mapped multidimensional cube, wherein the mapped multidimensional cube is associated with a second set of dimensions and a second set of measures. The operations further include adding, to the source fact table, one or more mapped dimensions corresponding to the second set of dimensions. The operations include associating, with the source multidimensional cube, one or more mapped measures corresponding to the second set of measures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An analytics engine comprising:
    a processor; and
    a memory storing instructions that, when executed by the processor, cause the processor to perform operations comprising:
        identifying a source fact table, wherein the source fact table includes a first set of dimensions and corresponds to a source multidimensional cube that is associated with a first set of measures;
        identifying a mapped multidimensional cube, wherein the mapped multidimensional cube is associated with a second set of dimensions and a second set of measures;
        adding, to the source fact table, one or more mapped dimensions corresponding to the second set of dimensions; and
        associating, with the source multidimensional cube, one or more mapped measures corresponding to the second set of measures.

2. The analytics engine of claim 1, wherein the operations further comprise adding a calculated value to the source fact table, wherein the calculated value corresponds to a formula that is evaluated during query execution based on execution of a particular measure of the second set of measures.

3. The analytics engine of claim 1, wherein the source fact table includes a mapping key dimension and wherein the mapped multidimensional cube is associated with a dimension that corresponds to the mapping key dimension.

4. The analytics engine of claim 3, wherein a value of the mapping key dimension for a particular fact uniquely identifies the particular fact of the source fact table.

5. The analytics engine of claim 1, wherein the operations further comprise:
    identifying a second mapped multidimensional cube, wherein the second mapped multidimensional cube is associated with a third set of dimensions and a third set of measures;
    adding, to the source fact table, one or more additional mapped dimensions corresponding to the third set of dimensions; and
    associating, with the source multidimensional cube, one or more additional mapped measures corresponding to the third set of measures.

6. The analytics engine of claim 1, wherein the source fact table comprises an employees fact table.

7. The analytics engine of claim 1, wherein the mapped multidimensional cube comprises a leave liabilities cube.

8. The analytics engine of claim 1, wherein the mapped multidimensional cube comprises a sales opportunities cube.

9. The analytics engine of claim 1, wherein the operations further comprise automatically adding the one or more mapped dimensions and associating the one or more mapped measures in response to startup of the analytics engine.

10. The analytics engine of claim 1, wherein the operations further comprise automatically adding the one or more mapped dimensions and associating the one or more mapped measures in response to an event, user input, or a combination thereof.

11. The analytics engine of claim 1, wherein members of at least one dimension of the first set of dimensions are static and wherein members of at least one mapped dimension are determined based on the mapped multidimensional cube during query execution.

12. A computer-readable storage device storing instructions that, when executed by a processor, cause the processor to perform operations comprising:
    identifying a source fact table, wherein the source fact table includes a first set of dimensions and corresponds to a source multidimensional cube that is associated with a first set of measures;
    identifying a mapped multidimensional cube, wherein the mapped multidimensional cube is associated with a second set of dimensions and a second set of measures;
    adding, to the source fact table, one or more mapped dimensions corresponding to the second set of dimensions; and
    associating, with the source multidimensional cube, one or more mapped measures corresponding to the second set of measures.

13. The computer-readable storage device of claim 12, wherein the operations further comprise:
- receiving, from a computing device, a query identifying the source multidimensional cube, a mapped measure associated with the source multidimensional cube, and one or more classification values;
- generating a cell set, wherein each cell of the cell set corresponds to a respective combination of the one or more classification values;
- executing the mapped measure with respect to each cell of the cell set to generate one or more query execution results; and
- sending the one or more query execution results to the computing device.

* * * * *